Patented Aug. 15, 1950

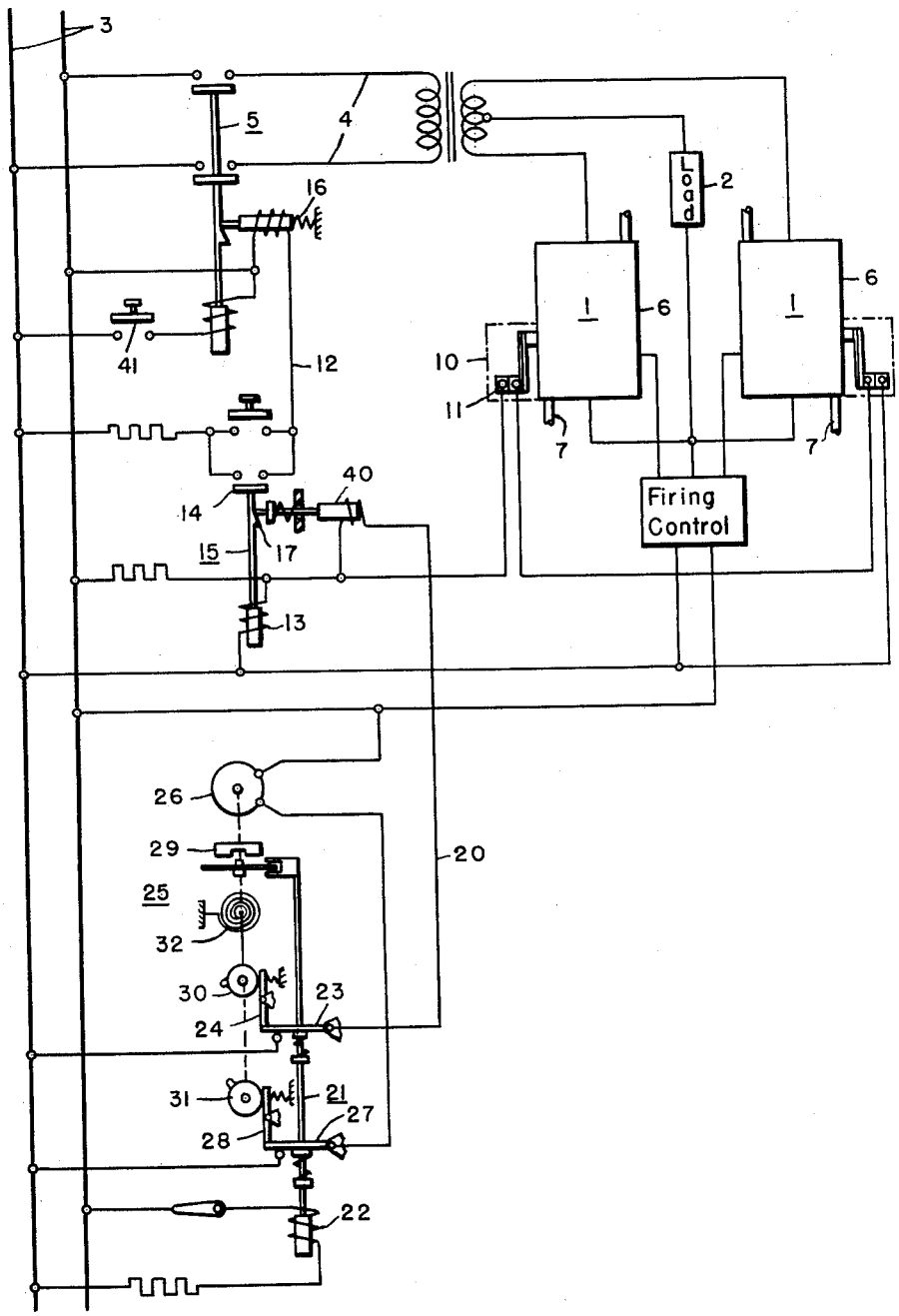

2,519,267

UNITED STATES PATENT OFFICE 2,519,267

VAPOR-ELECTRIC DEVICE

Charles R. Marcum, Pittsburgh, Pa., assignor to Westinghouse Electric Corporation, East Pittsburgh, Pa., a corporation of Pennsylvania Application March 16, 1949, Serial No. 81,642

6 Claims. (Cl. 315—118)

My invention relates to a vapor-electric device and particularly to a control circuit for preventing false lockout by thermal protective devices during power outages.

In vapor-electric converters, the overheating of the valves or their adjuncts, such as the mercury vapor pump, the heaters or other auxiliary equipment, can cause permanent damage such as mercury transfer, melting of solder seals or solder on cooling coils as well as oxidation of critical parts. For this reason it is customary to provide thermal protective devices so arranged as to lock out the unit in case of overtemperature to any critical portion of the device. This has resulted in inconvenience, because in the event of a power outage, the cooling circulating devices such as the water pump or blower stops, and the stored heat in the tubes or the auxiliary cause the thermal devices to trip and lock out the unit. Consequently, when power is again available, the unit is locked out of service and considerable time is lost until someone can visit the station and reset the thermal relays. While this is sufficiently troublesome in normally isolated stations, it is particularly disadvantageous in converters utilized in mining work where frequently the blowers or ventilating equipment is driven by power derived from the converter.

I have provided a supervisory circuit for preventing lockout by the thermal protective switches in the event of voltage failure, and provide a control circuit which definitely blocks the lockout equipment for a predetermined interval after the reapplication of power, and after this predetermined interval resets the protection circuit so that any actual thermal danger will be protected against.

It is, accordingly, an object of my invention to provide a system, giving full protection to a vapor-electric device in the event of actual cooling trouble but to prevent lockout of the unit due to power outage.

It is a further object of my invention to provide a control circuit for permitting cooling of an electrical device after a power outage without danger of false lockout.

It is a further object of my invention to provide a control circuit for preventing thermal lockout of an electric device for a predetermined interval after a voltage outage.

Other objects and advantages of my invention will be apparent from the following detailed description, taken in conjunction with the accompanying drawing, in which the figure is a schematic illustration of a vapor-electric device embodying my invention.

In the exemplary embodiment of my invention, a vapor-electric device having a plurality of electric valves 1 supplies a direct-current circuit 2 from an alternating-current circuit 3, the supply circuit 4 to the vapor-electric device being controlled by a switching device 5. The switching device 5 can be locked in normal conducting relation or closed position, or tripped to a nonconducting or open position.

For simplicity of illustration, I have shown the vapor-electric valves 1 as being enclosed in a metallic container 6 having cooling pipes 7 entering and leaving each of the containers 6.

In normal operation the heat produced by the operation of the valves 1 will be carried away by the cooling medium which is circulated by any suitable pumping device (not shown). However, in the event of voltage failure, the circulating pump would stop and the cooling system would no longer dissipate the heat present in the electric device. In this circumstance the container 1 becomes overheated because of the stored heat, and the thermal protective switch or relay 10 which receives heat from the container 1 will be actuated to open its contacts 11. In order to utilize such a switch 10 for protecting the device, I have provided a trip circuit 12 which is normally in an open position, but is provided with a relay 15 having an actuating coil 13 for moving a contact 14 to close the circuit 12 energizing a trip element 16 for the main switching device 5.

A detent 17 is provided for locking the closing relay 15 into position so that once the relay 15 is actuated, it must be manually or otherwise reset before the converter can again be placed in operation. In order to prevent lockout in normal operation, the thermal relays 10 are placed in a shunt circuit relation with the actuating coil 13 of the lockout relay 15 so that as long as the thermal relays 10 are in a closed position, the lockout relay 15 will be maintained inoperative. However, if any thermal switch 10, either on the valves as shown or on any protected auxiliary device, should open, the lockout device 15 would be actuated to take the converter out of service and the detent 17 lock it out until such time as the reset detent 17 is operated.

While it is desirable that any normal overtemperature should lock out the device, it is undesirable that the device should be locked out because of voltage failure to the device. To prevent this, I have provided an auxiliary circuit 20 operating a hold out solenoid 40 on the detent 17 and I provide circuit 20 with a no-voltage relay 21 having a normally energized actuating coil 22 which biases switch 23 to the open position. In the event of voltage failure the coil 22 will be deenergized removing the bias from switch 23 and switch 23 will close circuit 20.

A detent 24 locks in switch 23, maintaining circuit 20 energized after restoration of voltage on coil 22. Solenoid 40 then biases detent 17 to an inoperative position. In the event the nondissipated heat in the container 1 should open the relay 10 during or immediately after the voltage outage the relay 15 would trip breaker 5 and prevent current flow in supply circuit 4, but the circulating pump for the coolant would operate and cool the device allowing relays 10 to close and drop out relay 15 after which the converter can be placed in operation either by automatic or supervisory closing of starting switch 41.

The restoration of voltage energizes coil 22 and restores bias to switch 23 and I provide a timing device 25 to trip switch 23 and restore the normal protective characteristic of the system. I prefer to use a timing device 25 driven by a motor 26 energized through an auxiliary switch 27 carried by the relay 21.

In operation, the restoration of voltage energizes motor 26 through switch 27 which is held in by detent 28 while relay 21 actuates clutch 29 to connect motor 26 in driving relation with cams 30 and 31. After a predetermined time cam 30 actuates detent 24 to release switch 23 deenergizing the hold off of detent 17. After a longer time cam 31 releases detent 28 and allows switch 27 to deenergize motor 26. A recurrence of a voltage failure then opens clutch 29 and spring 32 resets the timing mechanism to the initial position.

For purposes of illustration, I have shown a preferred embodiment of my invention and described the same to the best of my present ability. I desire it to be understood, however, that such embodiment is exemplary only and that changes and modifications can be made therein without departing from the true spirit of my invention or the scope of the appended claims.

I claim as my invention:

1. A system for preventing false lockout of an electric conversion system comprising an electric valve, cooling means for said valve, a supply circuit therefor, switching means for said supply circuit, a tripping device for said switching means, a lockout relay controlling the energization of said tripping device for tripping said switching means to open said supply circuit, a thermal relay responsive to the thermal condition of said valve, circuit means controlled by said thermal relay for energizing said lockout relay, a no-voltage relay and circuit means controlled by said no-voltage relay for maintaining said lockout relay unlocked following a voltage failure.

2. A system for preventing false lockout of an electric conversion system comprising an electric valve, cooling means for said valve, a supply circuit therefor, switching means for said supply circuit, a tripping device for said switching means, a lockout relay for tripping said switching means to open said supply circuit, a thermal relay responsive to the thermal condition of said valve, circuit means controlled by said thermal relay for energizing said lockout relay, a no-voltage relay, circuit means controlled by said no-voltage relay maintaining said lockout relay unlocked following a voltage failure, and a timing device operative in response to operation of said no-voltage relay to reset said circuit including said no-voltage relay a predetermined interval after restoration of voltage.

3. In an electric conversion system, a heated element, a cooling system for removing heat from said element, circuit means supplying electric energy to said element, switching means for controlling said circuit, a relay operative to actuate said switching means to a predetermined position, a thermal actuated relay responsive to the temperature of said element, said thermal relay being operative upon predetermined temperature conditions of said element to energize said relay, a detent normally in position to hold said relay in a predetermined position, a voltage responsive relay responsive to a predetermined voltage condition for maintaining said detent in inoperative position, and a timing device responsive to a second voltage condition to reset said voltage responsive relay.

4. A supervisory system for a cooled electrical device comprising a supply circuit supplying electrical energy to said device, a switching means for said circuit, a lockout relay operative when energized to trip said switching means to the open position, a thermal relay in heat receiving relation to said device, a circuit including said thermal relay for maintaining said lockout relay deenergized for normal transfer of heat to said thermal relay, a latch normally in position to lock said lockout relay in energized position, a relay responsive to an abnormal voltage condition of said supply circuit, circuit means including said relay responsive to abnormal voltage for maintaining said latch inoperative with respect to said lockout relay regardless of the position of said thermal relay and a timing device operative to render said last-mentioned circuit means inoperative a predetermined time interval after restoration of normal voltage conditions in said supply circuit.

5. A protective system for an electric device comprising a supply circuit for said device, a cooling system for the device, a thermal switch responsive to the temperature of the device, a switching device in the supply circuit, a latch normally holding said switching device in closed position, a trip coil controlling said latch, an energizing circuit connected to said trip coil, a relay controlling the flow of current in the energizing circuit to the trip coil, circuit means including the said thermal switch determining the actuation of the relay to energize the trip coil, a detent normally in position to lock said relay in closed position, a solenoid controlling said detent, a voltage responsive relay normally maintaining said solenoid deenergized and operative on voltage failure to connect said solenoid to a source of energy and a timing device maintaining said connection a predetermined interval after voltage restoration.

6. In a vapor-electric device having a cooling system, a system for preventing false lockout in the event of temporary power failure comprising a switch controlling the energization of the device, a lockout relay operative when in closed position to trip said switch to deenergize the device, a thermal relay operative to control the position of said lockout relay, a locking device normally in position to retain said lockout relay in closed position after actuation of said lockout relay to closed position, a voltage responsive relay responsive to voltage failure on said device, a solenoid energized by operation of said voltage responsive relay rendering said locking device inoperative with respect to said lockout relay and a timing device energized through said voltage responsive relay by renewal of voltage to reset said voltage responsive relay after a predetermined interval of restored voltage.

CHARLES R. MARCUM.

No references cited.